United States Patent
Matsumura

(10) Patent No.: US 8,950,452 B2
(45) Date of Patent: Feb. 10, 2015

(54) MOTORCYCLE TIRE FOR RUNNING ON ROUGH TERRAIN

(75) Inventor: Sadahiko Matsumura, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 846 days.

(21) Appl. No.: 13/212,252

(22) Filed: Aug. 18, 2011

(65) Prior Publication Data

US 2012/0048436 A1 Mar. 1, 2012

(30) Foreign Application Priority Data

Aug. 26, 2010 (JP) .................. 2010-189941

(51) Int. Cl.
 *B60C 11/11* (2006.01)
 *B60C 11/03* (2006.01)

(52) U.S. Cl.
 CPC ............. *B60C 11/11* (2013.01); *B60C 11/0302* (2013.01); *B60C 2200/10* (2013.01); *B60C 2200/14* (2013.01); *Y10S 152/902* (2013.01)
 USPC ................. 152/209.11; 152/902; 152/209.28; 152/209.15

(58) Field of Classification Search
 CPC B60C 2200/14; B60C 2200/10; B60C 11/11; B60C 11/0302; B60C 11/03; B60C 11/00
 USPC .......... 152/209.11, 902, 904, 209.15, 209.28, 152/209.1; D12/536, 534, 533, 539, 544
 IPC ....................................................... B60C 11/11
 See application file for complete search history.

(56) References Cited

U.S. PATENT DOCUMENTS

2010/0319826 A1* 12/2010 Idei ........................... 152/209.15

FOREIGN PATENT DOCUMENTS

| EP | 2204295 A1 | * | 7/2010 | ............. B60C 11/11 |
| JP | 55136608 A | * | 10/1980 | ............. B60C 11/08 |
| JP | 63106115 A | * | 5/1988 | ............. B60C 11/11 |
| JP | 11-245627 A | | 9/1999 | |
| JP | 2010163144 A | * | 7/2010 | ............. B60C 11/11 |

* cited by examiner

*Primary Examiner* — Richard Crispino
*Assistant Examiner* — Philip N Schwartz
(74) *Attorney, Agent, or Firm* — Birch, Stewart, Kolasch & Birch, LLP

(57) ABSTRACT

A motorcycle tire for running on rough terrain comprises a tread portion having a unidirectional tread pattern and provided with T-sided blocks having a top surface, a heel-side sidewall surface extending from a heel-side edge of the top surface, and a toe-side sidewall surface extending from a toe-side edge of the top surface. The heel-side sidewall surface has an inclination angle α of from 0 to 15 degrees. The toe-side sidewall surface has a radially outer region having a height of from 20 to 55% of the block height and inclined at an angle β of from 20 to 45 degrees. A radially inner region of the toe-side sidewall surface has: a central part inclined at the same angle β as the radially outer region; a pair of lateral parts located one on each side of the central part and having an inclination angle γ of from 0 to 15 degrees; and a pair of stepped parts extending between the lateral parts and the central part in a direction crosswise to the toe-side edge.

8 Claims, 9 Drawing Sheets

MOTORCYCLE TIRE FOR RUNNING ON ROUGH TERRAIN

BACKGROUND OF THE INVENTION

The present invention relates to a pneumatic tire, more particularly to a tread block having a specific structure and a tread block arrangement for a motorcycle tire for running on rough terrain, capable of improving the braking stability and traction.

Motorcycle tires for running on rough terrain for example used in motocross races are usually provided with a plurality of blocks arranged sparsely in the tread portion so that the blocks dig into soft ground such as sandy and muddy terrains and thereby to produce a large traction.
When the amount of digging into the soft ground is increased, the running resistance (rolling resistance on soft ground) is increased.

SUMMARY OF THE INVENTION

It is therefore, an object of the present invention to provide a motorcycle tire for running on rough terrain, in which the running resistance especially during running on soft ground can be reduced without sacrificing large traction, and side skid or slip occurring when the brake is applied can be effectively controlled, and thereby the braking stability can be improved.

According to the present invention, a motorcycle tire for running on rough terrain comprises:
a tread portion provided with a plurality of blocks defining a unidirectional tread pattern for which a tire rotational direction is specified,
the blocks including T-sided blocks, the T-sided block having a top surface, a heel-side sidewall surface extending radially inwardly from a heel-side edge of the top surface, and a toe-side sidewall surface extending radially inwardly from a toe-side edge of the top surface, wherein
in a cross section perpendicular to the top surface and parallel to the tire circumferential direction, the angle a of inclination of the heel-side sidewall surface towards the heel-side is, at the heel-side edge, in a range of from 0 to 15 degrees with respect to the normal direction to the top surface,
the toe-side sidewall surface comprises
a radially outer region extending radially inwardly from the toe-side edge so as to have a height of from 20 to 55% of the height of the T-sided block, and
a radially inner region extending radially inwardly from the radially outer region,
the radially outer region is inclined toward the toe-side at an angle β of from 20 to 45 degrees with respect to the normal direction to the top surface at the toe-side edge,
the radially inner region has
a central part extending at the same angle β as the radially outer region,
a pair of lateral parts located one on each side of the central part and having at an inclination angle γ toward the toe-side in a range of from 0 to 15 degrees with respect to the normal direction, and
a pair of stepped parts extending between the lateral parts and the central part in a direction crosswise to the toe-side edge.
Therefore, the heel-side sidewall surfaces inclined at the less angle ensure the digging into the soft ground of the heel-side edges during running in particular when driving. Thus, a large traction can be obtained.

The radially outer region and the central part of the toe-side sidewall surface form a T-shaped gentle slope. During running without applying the brake and substantially without driving, owing to the T-shaped gentle slope, the digging of the block into the soft ground is lessened, therefore, the running resistance can be reduced.

Further, in the toe-side sidewall surface, since the lateral parts inclined at the less angle are formed at a relatively short radial distance from the block top surface, when the brake is applied, the lateral parts can produce sufficient braking force.

Furthermore, as the toe-side sidewall surface has the stepped parts facing the longitudinal direction of the toe-side edge, when the brake is applied during straight running, a side slip of the toe-side sidewall surface can be reduced.
Also, during cornering and when the brake is applied during cornering, the stepped parts resist against side skid of the tire, therefore, the braking stability can be improved.

As shown in FIG. 9, if the toe-side sidewall surface is not provided with the lateral parts and stepped parts, and the toe-side sidewall surface is formed by only a single gentle slope, the running resistance can be reduced. But, as the toe-side sidewall surface can not resist against the side skid or slip, the braking stability can not be improved.

In this application including specification and claims, various dimensions, positions and the like of the tire refer to those under a normally inflated unloaded condition of the tire unless otherwise noted.

The normally inflated unloaded state is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure is the maximum air pressure specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like.

DESCRIPTION OF EMBODIMENTS

Figure 1:
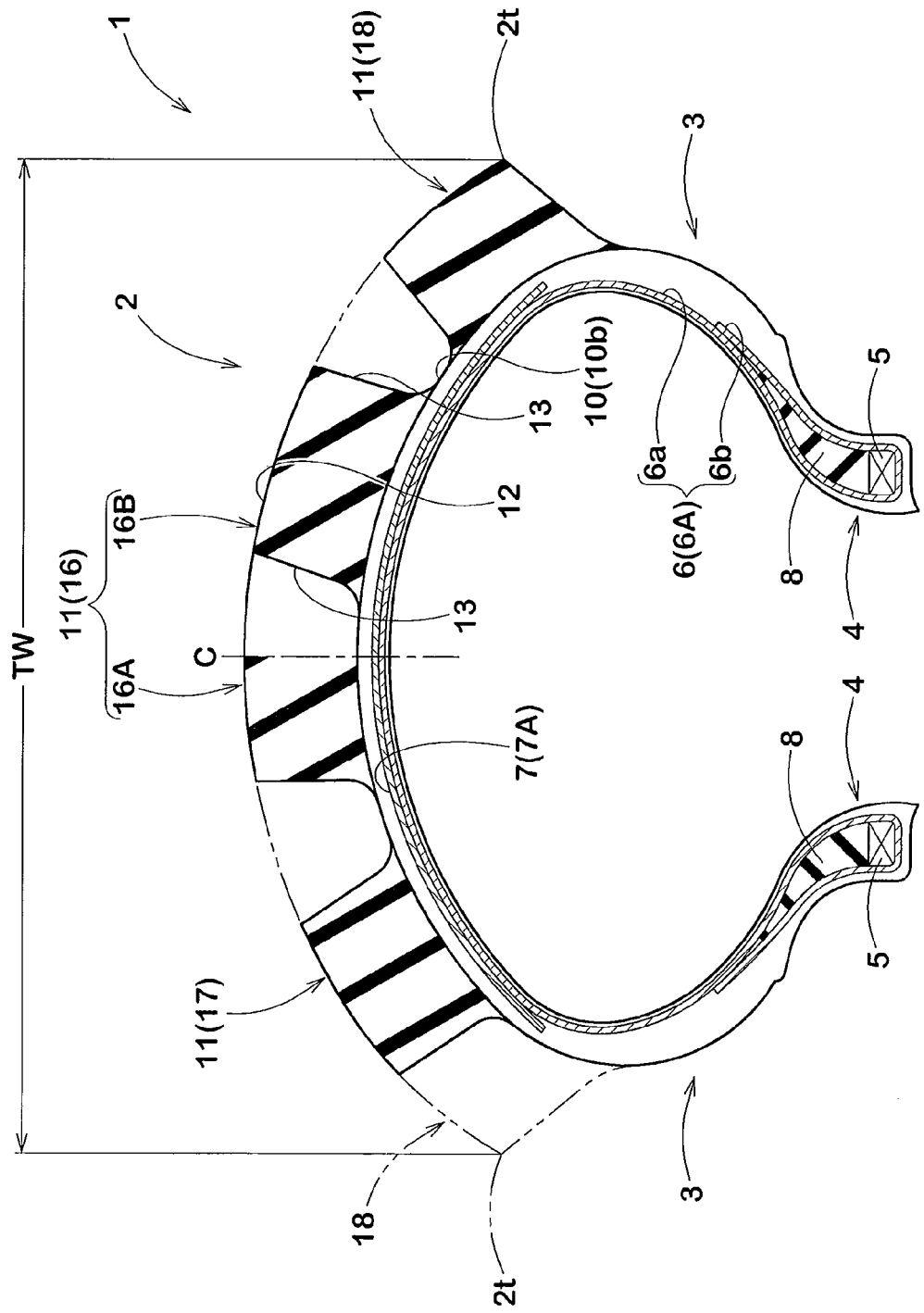
FIG. 1 is a cross sectional view of a motorcycle tire according to an embodiment of the present invention.

Embodiments of the present invention will now be described in detail in conjunction with the accompanying drawings.

In the drawings, motorcycle tire 1 according to the present invention comprises a tread portion 2 having tread edges 2t, a pair of bead portions 4 with a bead core 5 therein, a pair of sidewall portions 3 extending between the tread edges and bead portions, a carcass 6 extending between the bead portions 4 through the tread portion 2 and sidewall portions 3, and a tread reinforcing layer 7 disposed radially outside the carcass 6 in the tread portion 2.

The tread portion 2 is curved convexly so that the maximum cross section width TW of the tire lies between the tread edges 2t as shown in FIG. 1.

Figure 2:
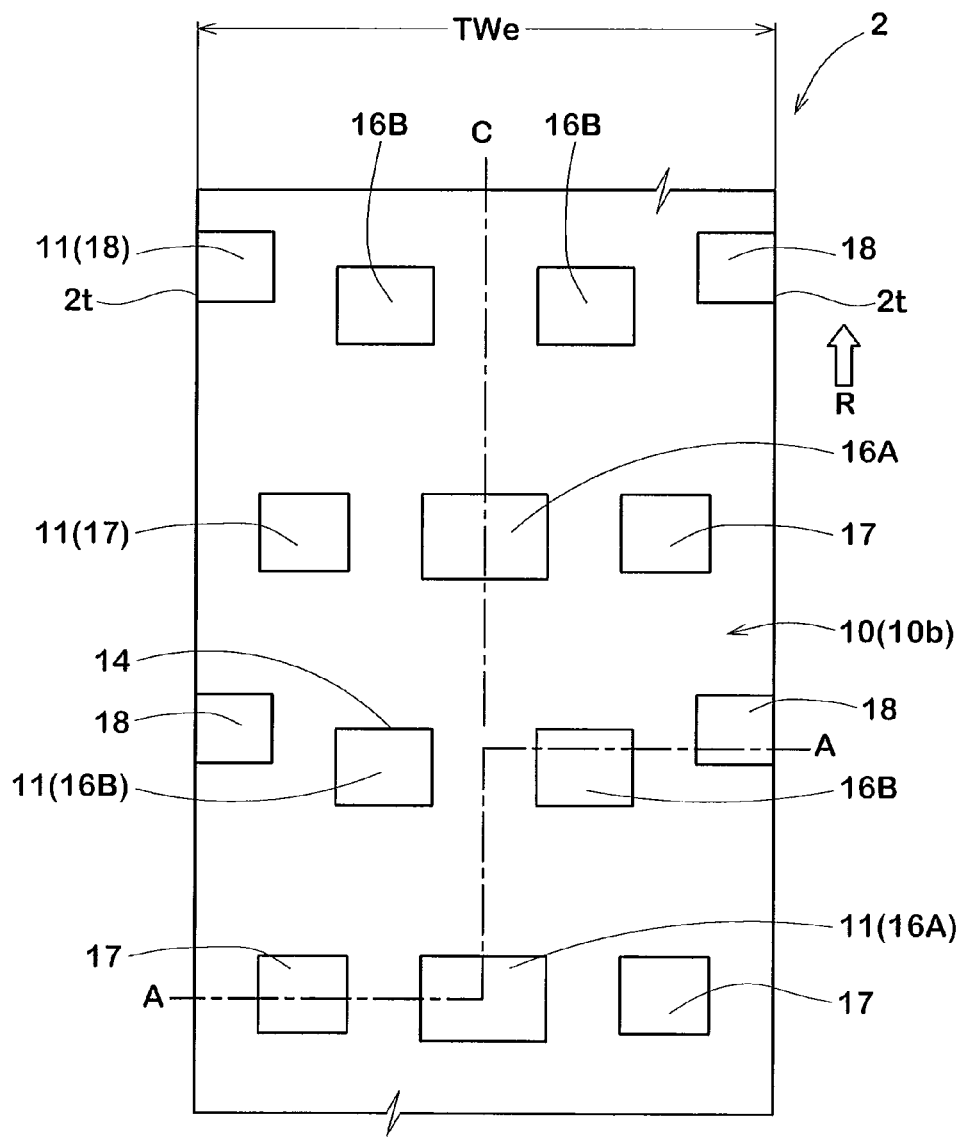
FIG. 2 shown a basic tread block arrangement designed for the motorcycle tire shown in FIG. 1.

In FIG. 1, there is shown a cross section of the tire 1 under the normally inflated unloaded state, taken along a line A-A of FIG. 2.

The carcass 6 is composed of one or more, in this example, only one ply 6A of carcass cords extending between the bead portions 4 through the tread portion 2 and sidewall portions 3 and turned up around the bead core 5 in each of the bead portions 4 from the inside to the outside of the tire so as to form a pair of carcass ply turned up portions 6b and a carcass ply main portion 6a therebetween. In this example, organic fiber cords are used as the carcass cords.
The carcass 6 in this example is of a radial structure, and the carcass cords in the carcass ply 6A are arranged radially at an angle of from 75 to 90 degrees with respect to the tire circumferential direction. However, it is also possible that the carcass 6 has a bias structure. Namely, the carcass 6 comprises at least two cross plies of carcass cords arranged obliquely, for example, at angles of 15 to 45 degrees with respect to the tire circumferential direction.

Meanwhile, between the carcass ply main portion 6a and turned up portion 6b in each of the bead portions, there is disposed a bead apex 8 made of a hard rubber compound extending radially outwardly from the radially outside of the bead core 5 in order to reinforce the bead portion 4 and a sidewall lower portion.

The above-mentioned tread reinforcing layer 7 is composed of one or more, in this example, only one ply 7A of reinforcing cords laid at an inclination angle of from 15 to 45 degrees with respect to the tire circumferential direction.
In this example, organic fiber cords are used as the reinforcing cords.

The tread portion 2 is provided with a plurality of blocks 11 separated from each other by tread grooves 10.

FIG. 2 shows a basic arrangement of the blocks 11 designed for use in motocross races so as to bring out maximum performance on soft ground such as sandy and muddy terrains.
As shown, the blocks 11 are arranged sparsely when compared with tires in other categories such as passenger car tires. As the tread grooves 10 are very broad when compared with a passenger car tire and the like, the grooved area of the tread portion is hereinafter referred to as "sea area 10".

The bottom 10b of the sea area 10 is a smooth surface extending substantially parallel with the radially outer surface of the carcass 6.

Preferably, the land ratio (Sb/S) is set in a range of from 5 to 25%. Here, the land ratio (Sb/s) is defined by a ratio of the total area Sb of the top surfaces 12 of all of the blocks 11 to the gross area S of the tire tread (namely, the area of the radially outer surface of the tread portion 2 including the grooved area).

Therefore, the blocks 11 can efficiently dig into soft ground and produce a larger traction.
Further, as the sea area 10 is broad, the mud compressed between the blocks can be easily self-ejected during tire revolution. If the land ratio (Sb/s) is more than 25%, the traction on the soft grounds becomes insufficient. If the land ratio (Sb/S) is less than 5%, the traction becomes insufficient on the hard and medium grounds.

In this embodiment. the tire 1 has a designed intended rotational direction R which is indicated in the sidewall portion 3. In the ground contacting patch of the tire, a side facing the traveling direction (namely, the opposite direction to the tire rotational direction R) is called "toe-side", and the opposite side is called "heel-side".

According to the present invention, the tread portion 2 is provided with T-sided blocks 21 having a specific configuration relative to the tire rotational direction R.

In this embodiment, non-T-sided blocks 22 having no specific configuration are also provided. Namely, the above-mentioned blocks 11 include the T-sided blocks 21 and non-T-sided blocks 22.

Figure 3:
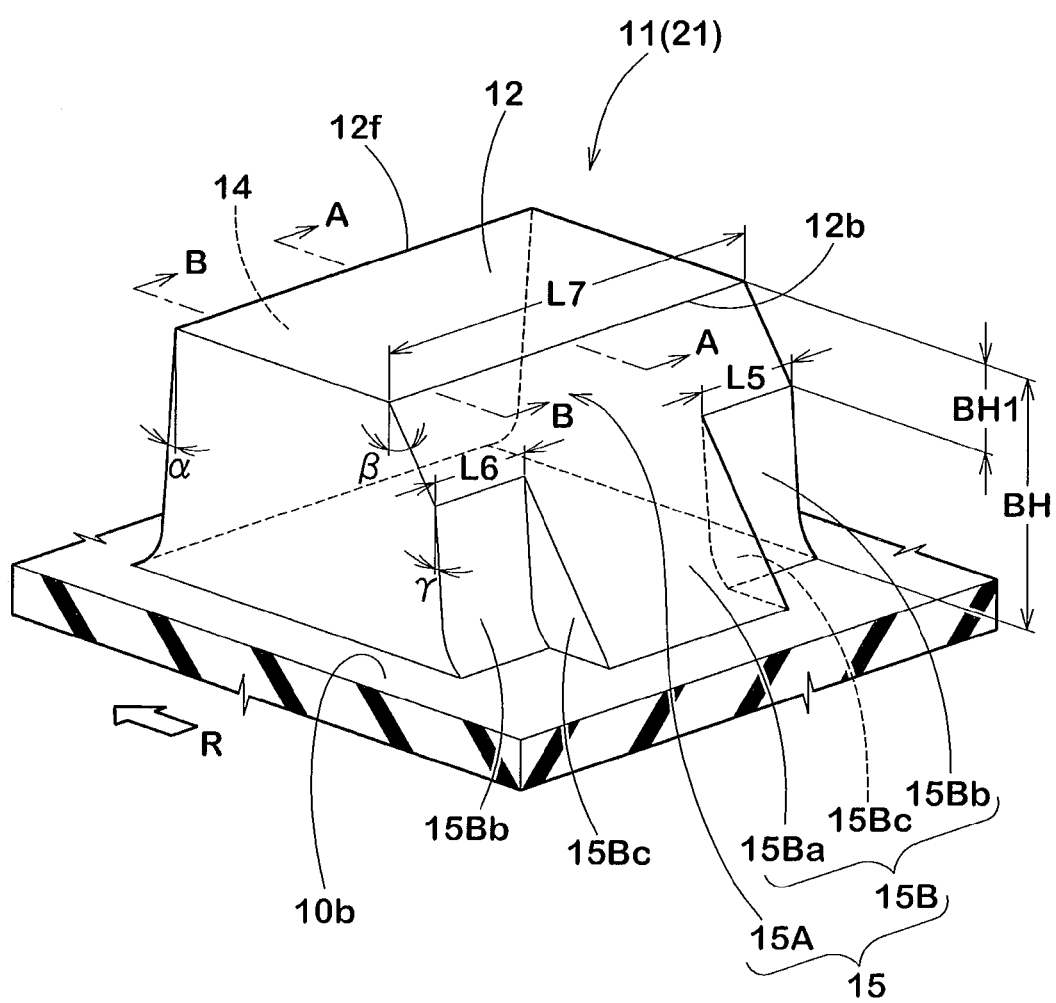
FIG. 3 is a perspective view of a T-sided block according to the present invention.
Figure 4A:
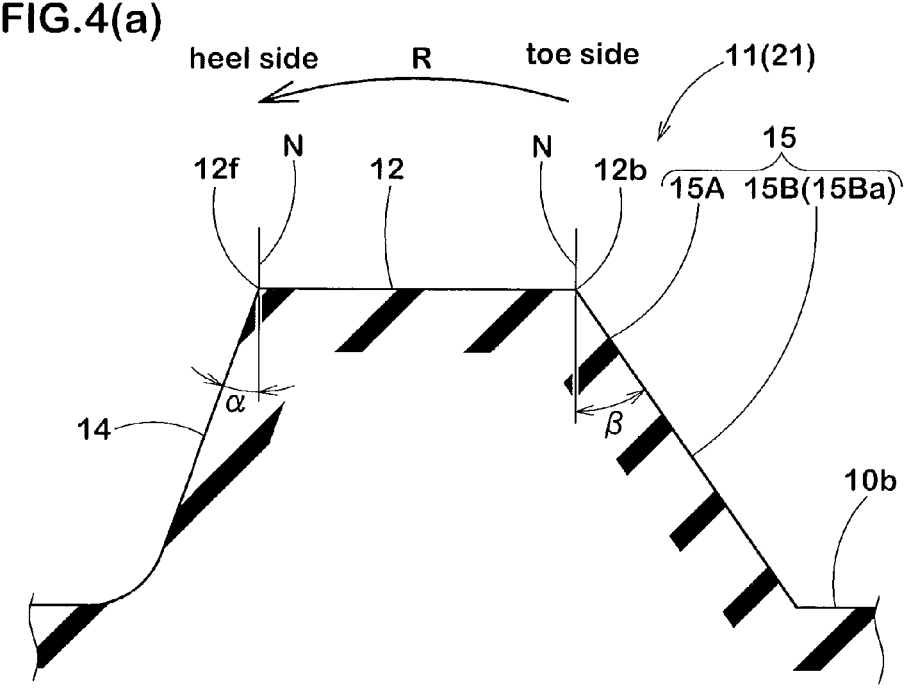
FIG. 4(a) is a cross sectional view taken along line A-A in FIG. 3.
Figure 4B:
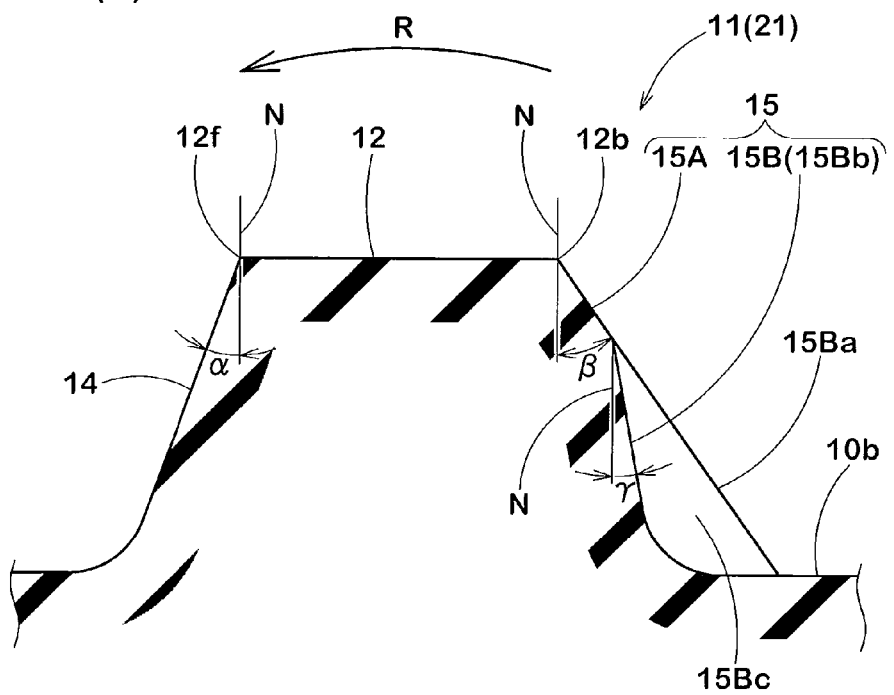
FIG. 4(b) is a cross sectional view taken along line B-B in FIG. 3.
Figure 5:
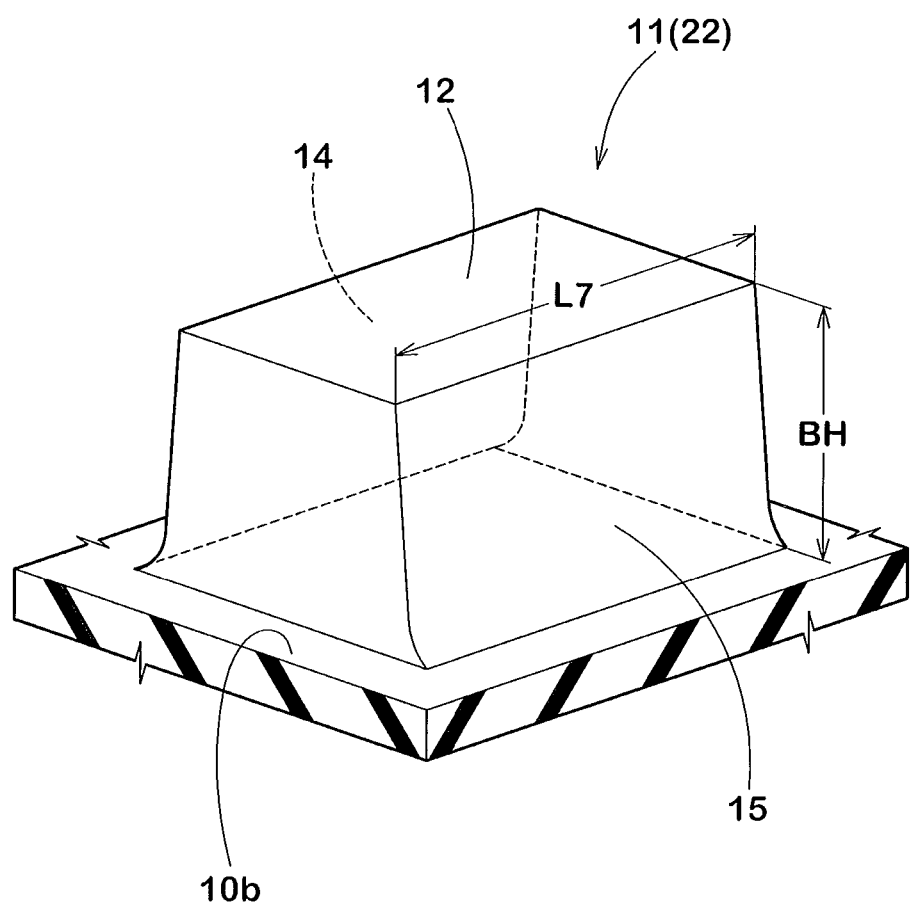
FIG. 5 is a perspective view of a non-T-sided block.

As shown in FIG. 3 and FIG. 4 (showing the T-sided block 21) and FIG. 5 (showing the non-T-sided block 22), the T-sided block 21 and non-T-sided block 22 each have a heel-side sidewall surface 14, a toe-side sidewall surface 15, and the top surface 12 having a heel-side edge 12f and a toe-side edge 12b.

In this embodiment, the heel-side edge 12f and toe-side edge 12b is straight and substantially parallel to the tire axial direction.
The edges 12f and 12b may be inclined with respect to the tire axial direction. In such a case, the inclination angles are preferably mot more than 15 degrees with respect to the tire axial direction.

In the case of the non-T-sided block 22, as shown in FIG. 5, the heel-side sidewall surface 14 and toe-side sidewall surface 15 had the same structure (steep slope) and extend radially inwardly from the heel-side edge 12f and the toe-side edge 12b toward the bottom 10b at an inclination angle α of from 0 to 15 degrees with respect to a normal line to the top surface 12 at the heel-side edge 12f and toe-side edge 12b, respectively.

In the case of the T-sided block 21, the heel-side sidewall surface 14 is similarly to that of the non-T-sided block 22, and extends radially inwardly from the heel-side edge 12f toward the bottom 10b at an inclination angle α of from 0 to 15 degrees with respect to a normal line N to the top surface 12 at the heel-side edge 12f. when the inclination angle α is more than 0 degree, the heel-side sidewall surface 14 is inclined to the heel-side (or to the tire rotational direction R) from the heel-side edge 12f to the bottom 10b.

The toe-side sidewall surface 15 of the T-sided block 21 extends radially inwardly from the toe-side edge 12b to the bottom 10b, and as shown in FIG. 3, it has a T-shaped part inclining to the toe-side.

The toe-side sidewall surface 15 is considered as being made up of a radially outer region 15A and a radially inner region 15B.

The radially outer region 15A extends radially inwardly from the toe-side edge 12b, inclining toward the toe-side at an angle β of from 20 to 45 degrees with respect to a normal line N to the top surface 12 at the toe-side edge 12b.
The radially outer region 15A has a height BH1 of from 20 to 55% of the height BH of the block.

The radially inner region 15B extends radially inwardly from the radially outer region 15A, and has a central part 15Ba which is a gentle slope inclined toward the toe-side from the radially outer region 15A and located at the center in the widthwise direction of the block (or tire axial direction), a pair of lateral parts 15Bb which are steep slopes located one on each side of the central part 15Ba and having an inclination angle γ of from 0 to 15 degrees with respect to the normal line N, wherein, when the inclination angle γ is more than 0 degree, the lateral parts 15Bb are inclined to the toe-side, and a pair of stepped parts 15Bc which are approximately right triangular, vertical surfaces extending in a direction substantially perpendicular to the toe-side edge 12b and connecting between the central part 15Ba and the lateral parts 15Bb respectively.

The inclination of the central part 15Ba is within the same range as the angle β of the radially outer region 15A. In this embodiment, the angle of the central part 15Ba is the same as the angle β. The central part 15Ba and the radially outer region 15A form a T-shaped flat surface.

Therefore, owing to the steep slope of the heel-side sidewall surface 14, the amount of digging into the soft ground, of the T-sided block 21 during driving is increased. Further, owing to the radially outer region 15A and central part 15Ba of the toe-side sidewall surface 15, the amount of digging into the soft ground during running without applying the brake can be decreased, and the running resistance can be decreased.

Further, when the brake is applied during cornering, as the stepped parts 15Bc of the radially inner region 15B become orthogonal to the direction of the side skid, the T-sided block 21 digging into the soft ground resists to the side skid, and thereby the braking stability can be improved.

If the angle α of the heel-side sidewall surface 14 is more than 15 degrees, there is a possibility that the block can not dig into the soft grounds sufficiently.

From this standpoint, the angle α of the heel-side sidewall surface 14 is preferably not more than 10 degrees, more preferably not more than 5 degrees, most preferably 0 degree.

If the angle β of the radially outer region 15A and the angle of the central part 15Ba is less than 20 degrees, there is a possibility that, during running without applying the brake, the amount of digging into the soft grounds can not be decrease sufficiently, therefore, it becomes difficult to reduce the running resistance. If the angle β is more than 45 degrees, the digging into the soft ground is excessively decreased, and there is a possibility that the braking force is decreased, and braking stability is deteriorated.

From this standpoint, the angle β is set in a range of not less than 20 degrees, preferably not less than 22 degrees, more preferably not less than 25 degrees, but not more than 45 degrees, preferably not more than 43 degrees, more preferably not more than 40 degrees.

If the angle γ of the lateral parts 15Bb is more than 15 degrees, the angle difference from the central part 15Ba is decreased, and the stepped parts 15Bc becomes excessively small, therefore, it becomes difficult to resist to the side skid. From this standpoint, the angle γ is preferably not more than 10 degrees, more preferably not more than 5 degrees, most preferably 0 degree.

If the height BH1 of the radially outer region 15A is less than 20% the block height BH, it becomes difficult to decrease the amount of the digging into the soft ground during running without applying the brake.

If the height BH1 is more than 55% of the block height BH, the stepped parts 15Bc becomes excessively small.

From this standpoint, the height BH1 is set in a range of not less than 20%, preferably not less than 26%, but not more than 55%, preferably not more than 52%, more preferably not more than 47% of the block height BH.

The total (L5+L6) of the lengths L5 and L6 of the paired lateral parts 15Bb and 15Bb measured along the toe-side edge 12b is preferably not less than 12%, more preferably not less than 20% of the length L7 of the toe-side edge 12b.

If the total length (L5+L6) is too small, when the brake is applied during cornering, as the digging into the soft ground becomes insufficient for the side skid or slip, the braking stability is liable to deteriorate.

If the total length (L5+L6) is too large, the rigidity of the radially inner region 15B decreases, and there is a possibility that the braking stability is deteriorated.

From this standpoint, the total length (L5+L6) is preferably not more than 60%, more preferably not more than 50% of the length L7 of the toe-side edge 12b.

In this embodiment, the length L5 is equal to the lengths L6.

It is preferable that the corner between the central part 15Ba and the stepped parts 15Bc is rounded by a smoothly curved surface to avoid stress concentration and to prevent the occurrence of cracks and the like.

In this embodiment, the heel-side sidewall surface 14 of the T-sided block 21 and the heel-side sidewall surface 14 of the non-T-sided block 22 are extended near to the bottom 10b of the sea area 10 and each connected to the bottom 10b through a smoothly curved surface. Thus, an almost entire part of each heel-side sidewall surface is a flat surface having its inclination angle.

In the above-mentioned basic arrangement of the blocks 11, the blocks 11 are:

crown blocks 16 the centroids 12G of the top surfaces 12 of which are located in the tread crown region Cr;

middle blocks 17 the centroids 12G of the top surfaces 12 of which are located in a pair of tread middle regions Md; and shoulder blocks 18 the centroids 12G of the top surfaces 12 of which are located in a pair of tread shoulder regions Sh.

The tread crown region Cr is defined as centered on the tire equator c and extending 40% of the tread developed width Twe. The tread middle regions Md are defined as extending 20% of the tread developed width Twe axially outwardly from the axial edges of the tread crown region Cr, respectively.

The tread shoulder regions Sh are defined as extending from the axially outer edges of the tread middle regions Md to the tread edges 2t.

Further, the crown blocks 16 include
first crown blocks 16A disposed on the tire equator c, and
plural pairs of second crown blocks 16B, wherein the paired two blocks 16B are disposed one on each side of the tire equator C at symmetrical positions about the tire equator C.

In this embodiment, the first crown blocks 16A and the second crown blocks 16B are arranged alternately in the tire circumferential direction.

The first crown block 16A has a circumferential length L1, and an axial width W1 more than the circumferential length L1 at the top surface 12 so as to increase the axial component of the block edge and thereby improve the traction during straight running.

Preferably, the axial width W1 is 0.1 to 0.3 times the tread developed width Twe, and the circumferential length L1 is 0.1 to 0.4 times the axial width W1.

In this example, the shape of the top surface 12 is a rectangle.

The second crown block 16B has a circumferential length L2, and an axial width W2 more than the circumferential length L2 at the top surface 12 so as to increase the axial component of the block edge on the axially outside of the first crown blocks 16A and thereby improve the traction and road grip in a transitional state from straight running to cornering.

Preferably, the axial width W2 is 0.08 to 0.14 times the tread developed width Twe, and the circumferential length L2 is 0.2 to 0.5 times the axial width W2.

In this example, the shape of the top surface 12 is a rectangle.

The middle block 17 has a circumferential length L3 and an axial width W3 at the top surface 12.

Preferably, the axial width W3 is 0.08 to 0.2 times the tread developed width TWe, and the circumferential length L3 is 0.5 to 1.0 times the axial width W3.

In this example, the shape of the top surface 12 is substantially square, and the circumferential length L3 is substantially same as the axial width W3.

The shoulder block 18 has a circumferential length L4 and an axial width W4 at the top surface 12.

Preferably, the axial width W4 is 0.05 to 0.1 times the tread developed width TWe, and the circumferential length L4 is 0.8 to 1.0 times the axial width W4.

In this example, the shape of the top surface 12 is substantially square, and the axial width W4 is substantially same as the circumferential length L4 in order to improve the traction and lateral grip during cornering on the soft ground.

As to the shape of the top surface 12 of the blocks 16A, 16B, 17 and 18, various shapes, for example, circumferentially long rectangle, trapezoid, parallelogram and the like may be employed. But, in this embodiment, as described above, the blocks 16A, 16B, 17 and 18 are formed as the axially long rectangle and substantially square.

As to the sidewall surfaces other than the heel-side and toe-side sidewall surfaces 14 and 16, in this embodiment, regardless of the T-sided block or the non-T-sided block, all the blocks 11 each have lateral sidewall surfaces extending from the axial edges of the top surface 12 toward the bottom 10b at inclination angles within the same range as the inclination angle α (0 to 15 degrees). similarly to the heel-side sidewall surface 14, the lateral sidewall surfaces extend near to the bottom 10b and each connected to the bottom 10b through a smoothly curved surface. Thus, an almost entire part of the lateral sidewall surface is a flat surface.

Figure 6:
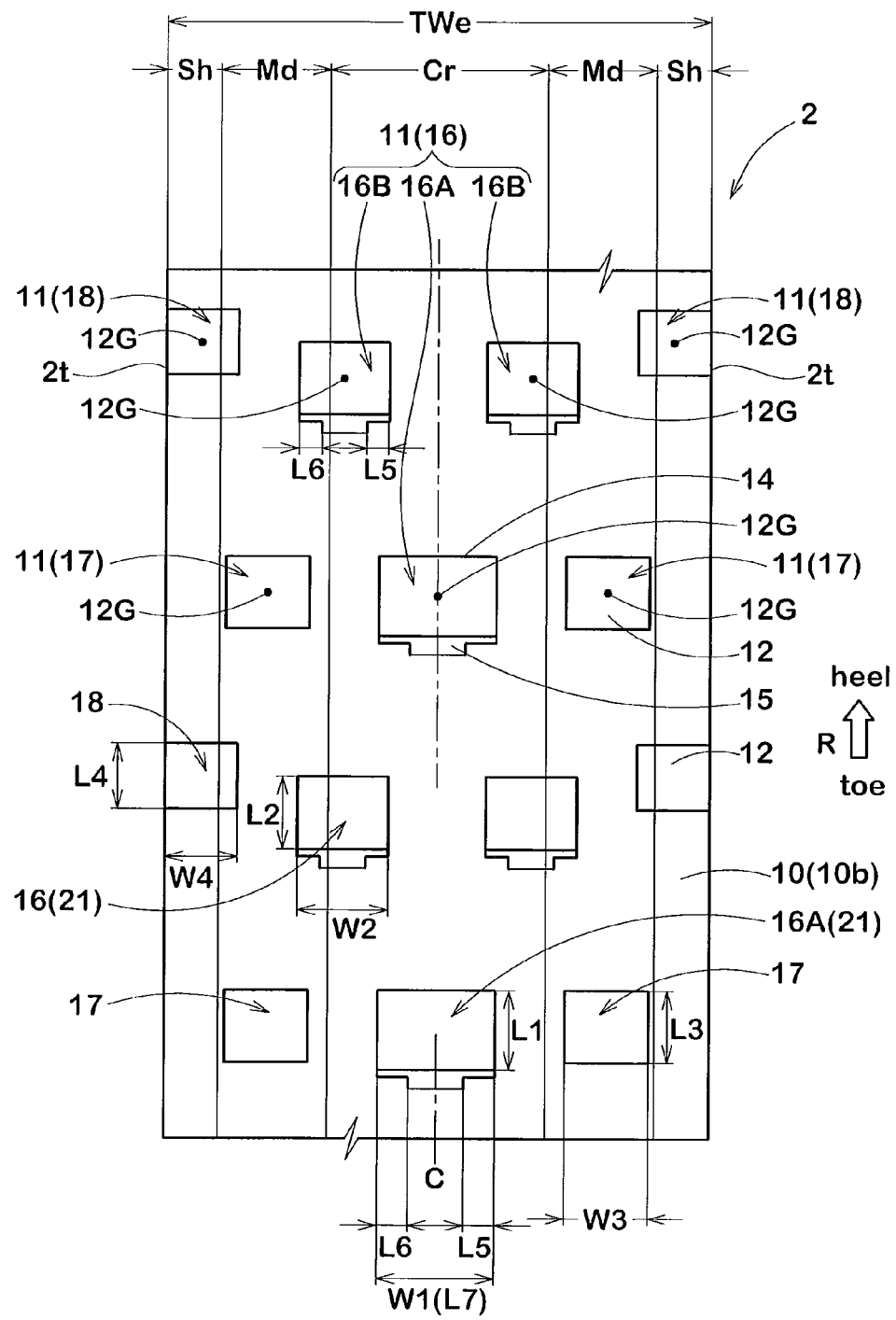
FIGS. 6, 7 and 8 show practical examples of the tread block arrangement based on the basic tread block arrangement shown in FIG. 2.
Figure 7:
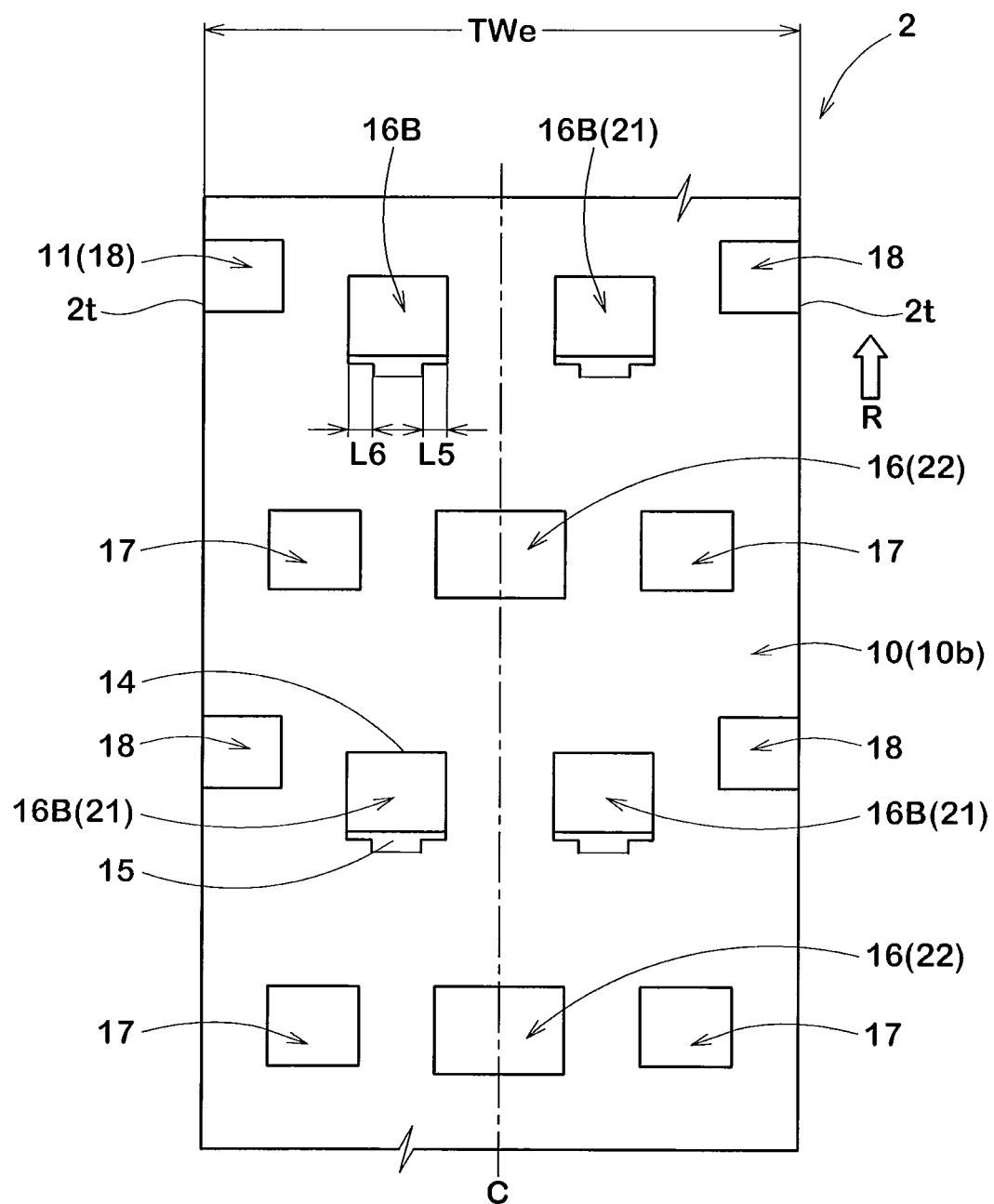
Figure 8:
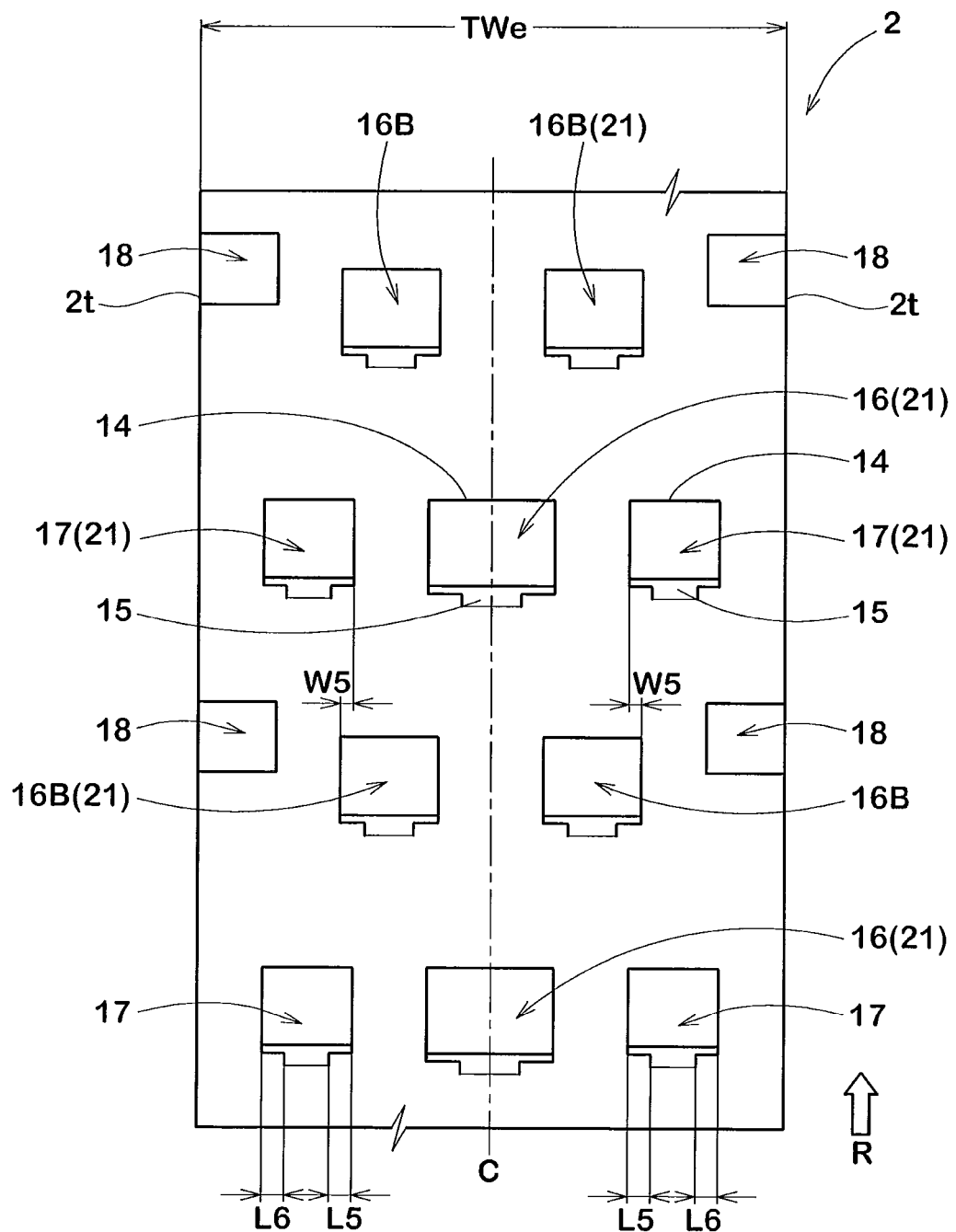
Figure 9:
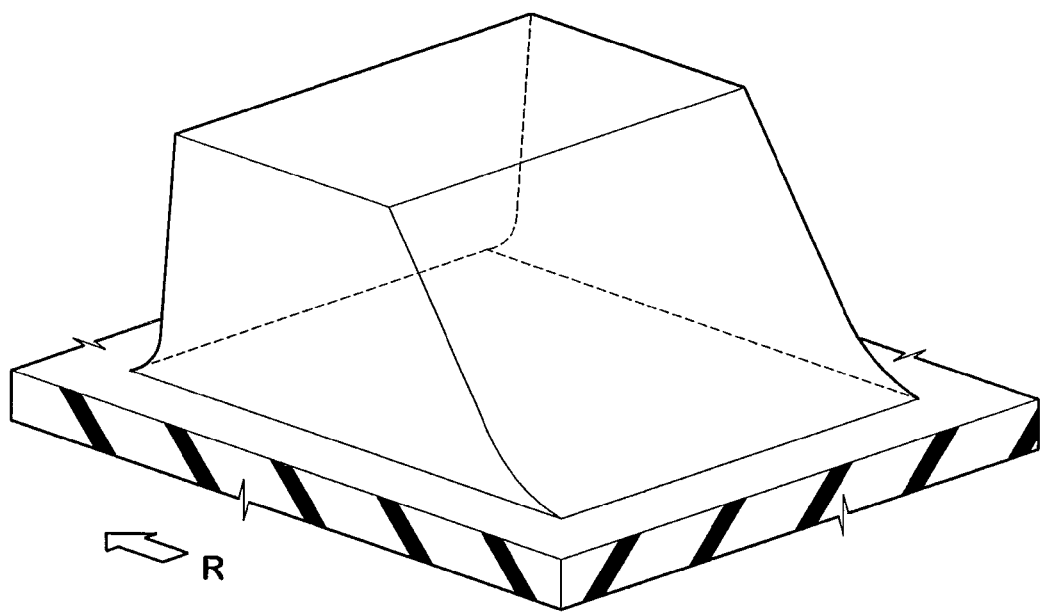
FIG. 9 is a perspective view of a block for comparative explanation of the effect of the T-sided block.

FIGS. 6, 7 and 8 show practical examples of the block arrangement based on the basic arrangement shown in FIG. 2.

The above-mentioned T-sided block 21 is preferably disposed in the tread crown region Cr as the crown block 16.

In FIG. 6, all of the first crown blocks 16A and second crown blocks 16B are formed as the T-sided block 21. The other blocks are the non-T-sided block 22. Therefore, the T-sided blocks 21 are arranged over the relatively wide tread crown region Cr, and as a result, it is possible to improve the traction during straight running where the ground pressure is relatively high in the crown blocks 16 as well as the braking stability in the initial stage of cornering.

In the case of the tire for use in muddy terrain where the blocks 11 digging deep into the muddy ground are also required in order to improve the traction on the muddy ground, it is possible to arrange the non-T-sided blocks 22 in the crown region Cr as the crown block 16.

FIG. 7 shows an example for such case, wherein as the crown blocks, the T-sided blocks 21 and the non-T-sided blocks 22 are alternately arranged in the tire circumferential direction in order to improve the traction on the muddy ground and the braking stability in the initial stage of cornering in a well balanced manner. In this example, the second crown blocks 16B are the T-sided block 21, and the first crown blocks 16A are the non-T-sided block 22. Therefore, during straight running where the ground pressure becomes relatively high in the first crown block 16A, the amount of digging into of the muddy ground, of the first crown block 16A increases and the traction can be improved. Further, in the initial stage of cornering where the ground pressure becomes relatively high the second crown blocks 16B, the toe-side sidewall surface 15 of the second crown block 16B can resist to side skid and the braking stability can be improved. Accordingly, it is possible to improve the traction and braking stability in a well balanced manner.

In FIG. 7, the other blocks 11, namely, middle blocks 17 and shoulder blocks 18 are the non-T-sided blocks 22.

As shown in FIG. 8, it is also preferable that the T-sided block 21 is disposed in the tread middle regions Md as the middle block 17 in order to improve the braking stability from the initial stage to middle stage of cornering where mainly the middle blocks 17 contact with the ground.

In this case, it is preferable that the middle blocks 17 as the T-sided block 21 are aligned with the axially adjacent crown blocks 16 (in this embodiment, first crown blocks 16A) as the T-sided block 21. Therefore, from the crown blocks 16 to the middle blocks 17, the heel-side sidewall surfaces 14 thereof can contact with the ground consistently, and owing to the increased amount of digging into the soft ground, the traction can be further improved.

Further, from the crown blocks 16 to the middle blocks 17, the stepped parts 15Bc thereof can contact with the ground consistently, therefore, the braking stability during cornering can be further improved.

In FIG. 8, all of the crown blocks 16 and middle blocks 17 are the T-sided block 21, and all the shoulder blocks 18 are the non-T-sided blocks 22.

In this case, it is preferable that, in the tire axial direction, the middle blocks 17 overlap with the second crown blocks 16B by a certain amount W5, and also the second crown blocks 16B overlap with the first crown blocks 16A by a certain amount W5 so that the T-sided blocks 21 are arranged over wide axial range seamlessly in the tire axial direction.

In this embodiment, the length L5 and length L6 of the paired lateral parts 15Bb are the substantially same values. But, the lengths L5 and L6 may be differed from each other.

In the case that the first crown block 16A centered on the tire equator is the T-sided block 21, in view of the straight running stability, L5=L6 is preferable.

But, in the case that the T-sided block 21 is disposed off the tire equator as the second crown block 16B or middle block 17 for instance, it may be preferable that the length L5 of the lateral part 15Bb located on the tire equator C side is less than the length L6 of the lateral part 15Bb located on the tread edge side because the increased traction can be obtained stably even when the running condition is changed from straight running to cornering. In this case, however, it is preferred that the length L5 is not less than 35%, preferably not less than 38% of the total length (L5+L6).

Comparison Tests

Motorcycle tires having the internal structure shown in FIG. 1 and tread patterns shown in FIGS. 6, 7 and 8 and FIG. 2 were prepared and tested. In the case of FIG. 2, all the blocks were the non-T-sided block 22.

Except for the specifications shown in Table 1, all of the tires had the same specifications.

In the test, a 450 cc motorcycle provided with the same kind of front and rear tires (tire pressure: front=rear=80 kPa) was run on a rough terrain prepared in a tire test course, and the running resistance (rolling resistance), traction and braking stability (sandy terrain), traction and braking stability (muddy terrain), braking force, and cornering grip were evaluated by a professional test rider.

The results are indicated in Table 1 by an index based on a comparative example tire Ref. 1 being 100. In the case of the running resistance, the smaller value is better. In other cases, the larger value is better.

Specifications common to all of the tire are as follows.
- front tire size: 80/100-21 (rim size: 21×1.60)
- rear tire size: 120/80-19 (rim size: 19×2.15)
- maximum tire section width TW: 130 mm
- tread developed width Twe: 170 mm
- land ratio (Sb/S): 15%
- block height BH: 19 mm
- first crown block
  - axial width W1: 40 mm (0.23 Twe)
  - circumferential length L1: 10 mm (0.25 W1)
  - toe-side edge length L7: 40 mm
- second crown block
  - axial width W2: 20 mm (0.12 Twe)
  - circumferential length L2: 10 mm (0.5 W2)
  - toe-side edge length L7: 20 mm
- middle block
  - axial width W3: 16 mm (0.09 Twe)
  - circumferential length L3: 10 mm (0.63 W3)
  - toe-side edge length L7: 16 mm
- shoulder block
  - axial width W4: 12 mm (0.07 Twe)
  - circumferential length L4: 20 mm (1.67 W4)

TABLE 1

| Tire | Ref. 1 | Ref. 2 | Ref. 3 | Ex. 1 | Ex. 2 | Ex. 3 | Ref. 4 | Ex. 4 |
|---|---|---|---|---|---|---|---|---|
| tread pattern | FIG. 2 | FIG. 2 | FIG. 2 | FIG. 6 | FIG. 6 | FIG. 6 | FIG. 6 | FIG. 6 |
| T-sided block heel-side sidewall surface | | | | | | | | |
| angle α(deg.) | 0 | 5 | 0 | 0 | 0 | 0 | 0 | 0 |
| toe-side sidewall surface radially outer region | | | | | | | | |
| height BH1(mm) | — | — | — | 7.6 | 7.6 | 3.8 | 11.4 | 7.6 |
| BH1/BH (%) | — | — | — | 40 | 40 | 20 | 60 | 40 |
| angle β(deg.) | 35 | 35 | 25 | 35 | 40 | 40 | 40 | 40 |
| lateral parts | | | | | | | | |
| angle γ(deg.) | — | — | — | 15 | 15 | 15 | 15 | 15 |
| as first crown block | | | | | | | | |
| length L5(mm) | — | — | — | 8 | 8 | 8 | 8 | 4.8 |
| length L6(mm) | — | — | — | 8 | 8 | 8 | 8 | 11.2 |
| L5/(L5 + L6)(%) | — | — | — | 50 | 50 | 50 | 50 | 30 |
| (L5 + L6)/L7(%) | — | — | — | 40 | 40 | 40 | 40 | 40 |
| as second crown block | | | | | | | | |
| length L5(mm) | — | — | — | 4 | 4 | 4 | 4 | 4 |
| length L6(mm) | — | — | — | 4 | 4 | 4 | 4 | 4 |
| L5/(L5 + L6)(%) | — | — | — | 50 | 50 | 50 | 50 | 50 |
| (L5 + L6)/L7(%) | — | — | — | 40 | 40 | 40 | 40 | 40 |
| as middle block | | | | | | | | |
| length L5(mm) | — | — | — | — | — | — | — | — |
| length L6(mm) | — | — | — | — | — | — | — | — |
| L5/(L5 + L6)(%) | — | — | — | — | — | — | — | — |
| (L5 + L6)/L7(%) | — | — | — | — | — | — | — | — |
| overlap W5 (mm) | — | — | — | — | — | — | — | — |
| W5/TWe(%) | — | — | — | — | — | — | — | — |
| Test results | | | | | | | | |
| running resistance | 100 | 100 | 110 | 105 | 95 | 100 | 95 | 98 |
| traction (sand) | 100 | 95 | 100 | 100 | 105 | 100 | 105 | 105 |
| traction (mud) | 100 | 95 | 105 | 105 | 95 | 100 | 90 | 105 |
| braking stability (sand) | 100 | 100 | 100 | 110 | 110 | 110 | 100 | 107 |
| braking stability (mud) | 100 | 100 | 105 | 100 | 95 | 100 | 90 | 95 |
| braking force | 100 | 100 | 110 | 110 | 110 | 115 | 100 | 107 |
| cornering grip | 100 | 100 | 100 | 110 | 110 | 115 | 105 | 103 |

| Tire | Ex. 5 | Ex. 6 | Ex. 7 | Ref. 5 | Ref. 6 | Ex. 8 | Ex. 9 |
|---|---|---|---|---|---|---|---|
| tread pattern | FIG. 6 | FIG. 6 | FIG. 6 | FIG. 6 | FIG. 6 | FIG. 7 | FIG. 8 |
| T-sided block heel-side sidewall surface | | | | | | | |
| angle α(deg.) | 0 | 0 | 0 | 0 | 0 | 0 | 0 |
| toe-side sidewall surface radially outer region | | | | | | | |
| height BH1(mm) | 7.6 | 7.6 | 7.6 | 7.6 | 7,6 | 7.6 | 7.6 |
| BH1/BH (%) | 40 | 40 | 40 | 40 | 40 | 40 | 40 |
| angle β(deg.) | 40 | 40 | 20 | 15 | 50 | 40 | 40 |
| lateral parts | | | | | | | |
| angle γ(deg.) | 15 | 15 | 15 | 5 | 15 | 15 | 15 |

TABLE 1-continued

|  |  |  |  |  |  |  |  |
|---|---|---|---|---|---|---|---|
| as first crown block |  |  |  |  |  |  |  |
| length L5(mm) | 12 | 4 | 8 | 8 | 8 | — | 8 |
| length L6(mm) | 12 | 4 | 8 | 8 | 8 | — | 8 |
| L5/(L5 + L6)(%) | 50 | 50 | 50 | 50 | 50 | — | 50 |
| (L5 + L6)/L7(%) | 60 | 12 | 40 | 40 | 40 | — | 40 |
| as second crown block |  |  |  |  |  |  |  |
| length L5(mm) | 4 | 4 | 4 | 4 | 4 | 4 | 4 |
| length L6(mm) | 4 | 4 | 4 | 4 | 4 | 4 | 4 |
| L5/(L5 + L6)(%) | 50 | 50 | 50 | 50 | 50 | 50 | 50 |
| (L5 + L6)/L7(%) | 40 | 40 | 40 | 40 | 40 | 40 | 40 |
| as middle block |  |  |  |  |  |  |  |
| length L5(mm) | — | — | — | — | — | — | 3 |
| length L6(mm) | — | — | — | — | — | — | 3 |
| L5/(L5 + L6)(%) | — | — | — | — | — | — | 50 |
| (L5 + L6)/L7(%) | — | — | — | — | — | — | 40 |
| overlap W5 (mm) | — | — | — | — | — | — | 3 |
| W5/TWe(%) | — | — | — | — | — | — | 1.8 |
| Test results |  |  |  |  |  |  |  |
| running resistance | 100 | 100 | 110 | 115 | 85 | 97 | 95 |
| traction (sand) | 110 | 105 | 100 | 95 | 100 | 105 | 100 |
| traction (mud) | 100 | 100 | 105 | 95 | 100 | 100 | 95 |
| braking stability (sand) | 105 | 102 | 100 | 95 | 80 | 106 | 115 |
| braking stability (mud) | 100 | 95 | 105 | 95 | 90 | 95 | 100 |
| braking force | 105 | 102 | 105 | 105 | 80 | 107 | 110 |
| cornering grip | 105 | 105 | 100 | 95 | 85 | 110 | 110 |

The invention claimed is:

1. A motorcycle tire for running on rough terrain comprising
a tread portion provided with a plurality of blocks defining a unidirectional tread pattern for which a tire rotational direction is specified,
the blocks including a T-sided block,
the T-sided block having a top surface, a heel-side sidewall surface extending radially inwardly from a heel-side edge of the top surface, and a toe-side sidewall surface extending radially inwardly from a toe-side edge of the top surface, wherein
in a cross section perpendicular to the top surface and parallel to the tire circumferential direction, the angle α of inclination of the heel-side sidewall surface towards the heel-side is, at the heel-side edge, in a range of from 0 to 15 degrees with respect to the normal direction to the top surface,
the toe-side sidewall surface comprises
a radially outer region extending radially inwardly from the toe-side edge so as to have a height of from 20 to 55% of the height of the T-sided block, and
a radially inner region extending radially inwardly from the radially outer region,
said radially outer region is inclined toward the toe-side at an angle β of from 20 to 45 degrees with respect to the normal direction to the top surface at the toe-side edge,
the radially inner region has
a central part extending at the same angle β as the radially outer region,
a pair of lateral parts located one on each side of the central part and having at an inclination angle γ toward the toe-side in a range of from 0 to 15 degrees with respect to the normal direction, and
a pair of stepped parts extending between the lateral parts and the central part in a direction crosswise to the toe-side edge.

2. The motorcycle tire according to claim 1, wherein
the total length of the paired lateral parts at their radially outer edge measured in the direction along the toe-side edge is in a range of from 12 to 60% of the length of the toe-side edge.

3. The motorcycle tire according to claim 1 or 2, wherein
the blocks include crown blocks the centroids of the ground contacting top surfaces of which are disposed in a tread crown region defined as having a developed width of 40% of the tread developed width, and
at least one of the crown blocks is said T-sided block.

4. The motorcycle tire according to claim 1 or 2, wherein
the blocks include crown blocks the centroids of the ground contacting top surfaces of which are disposed in a tread crown region defined as having a developed width of 40% of the tread developed width, and
the crown blocks are the T-sided blocks and non-T-sided blocks alternately disposed in the tire circumferential direction.

5. The motorcycle tire according to claim 3, wherein
the blocks include middle blocks the centroids of the ground contacting top surfaces of which are disposed in a pair of tread middle regions defined as extending axially outwardly from the axial edges of the crown region and each having a developed width of 20% of the tread developed width, and
at least one of the middle blocks is said T-sided block.

6. The motorcycle tire according to claim 5, wherein
the middle blocks are at least partially overlap the crown blocks in the tire axial direction.

7. The motorcycle tire according to claim 4, wherein
the blocks include middle blocks the centroids of the ground contacting top surfaces of which are disposed in a pair of tread middle regions defined as extending axially outwardly from the axial edges of the crown region and each having a developed width of 20% of the tread developed width, and
at least one of the middle blocks is said T-sided block.

8. The motorcycle tire according to claim 7, wherein
the middle blocks at least partially overlap the crown blocks in the tire axial direction.

* * * * *